United States Patent [19]

Cavanagh, Jr. et al.

[11] 4,093,157

[45] June 6, 1978

[54] SEAL FOR VARIABLE PLUG TWO DIMENSIONAL NOZZLE

[75] Inventors: Robert B. Cavanagh, Jr.; David K. Jan, both of Rockville, Conn.

[73] Assignee: United Technologies Corporation, Hartford, Conn.

[21] Appl. No.: 825,127

[22] Filed: Aug. 16, 1977

Related U.S. Application Data

[63] Continuation of Ser. No. 751,802, Dec. 16, 1976, abandoned.

[51] Int. Cl.² ............................................ F02K 11/04
[52] U.S. Cl. .................................... 244/53 R; 60/230; 60/266; 239/127.3
[58] Field of Search ................... 244/53 R; 239/127.1, 239/127.3; 277/135, 71; 60/39.66, 230, 266, 271

[56] References Cited

U.S. PATENT DOCUMENTS

| 3,774,868 | 11/1973 | Goetz | 244/53 R |
| 3,970,252 | 7/1976 | Smale et al. | 239/127.3 |
| 3,981,448 | 9/1976 | Demogenes et al. | 239/127.3 |

*Primary Examiner*—Barry L. Kelmachter
*Attorney, Agent, or Firm*—Norman Friedland

[57] ABSTRACT

This invention relates to a seal adapted to prevent leakage at the interface of a movable plug with articulated panels and the side wall of a two-dimensional nozzle for a gas turbine engine. The seal prevents the high pressure cooling air internal of the plug from escaping to the lower pressure exhaust gases and comprises judiciously located dam-like members installed in the vent slots in the side wall fabricated from Finwall ® material which material achieves indirect heat exchange relation and film cooling.

4 Claims, 3 Drawing Figures

SEAL FOR VARIABLE PLUG TWO DIMENSIONAL NOZZLE

CROSS REFERENCE

This patent application is a continuation of U.S. application Ser. No. 751,802 filed on Dec. 16, 1976 which is now abandoned.

BACKGROUND OF THE INVENTION

This invention relates to variable plug two-dimensional nozzles of a jet engine and particularly to means for sealing at the interface of the movable plug and side wall, which side wall is fabricated from Finwall ® material.

Because of the hostile environment in which the variable plug operates, cooling of the component parts are necessary. One such method of cooling is described in a U.S. patent application Ser. No. 751,428 filed on Dec. 16, 1976 by John H. Young and Gerald F. Goetz. One feature of the cooling system is the incorporation of Finwall constructed wall which provides a core of passages which permits the flow of cooling air so that the cooling air is in indirect heat exchange relationship at the skin surfaces of the parts exposed to the flow of the engine's exhaust. Many segments make up the Finwall constructed walls such that the cooling flow exiting into the engine's exhaust stream vents through slots along the outer skin of the wall to form a film of cooling air.

In a thrust vectoring, variable area two-dimensional nozzle, the plug is articulated to move to form certain configurations defining optimum aircraft performance characteristics, as described, for example, in U.S. Pat. No. 3,774,868 granted on Nov. 27, 1973, incorporated herein by reference. As noted in U.S. Pat. No. 3,774,868, supra, it will be appreciated that the panels of the plug move relative to the adjacent side walls. In the cooling scheme contemplated, the plug is pressurized with cooler air to some value higher than the corresponding pressure of the engine's exhaust adjacent the outer panel walls and thus when slotted Finwall constructed side walls are utilized an excessive leakage path is envisioned. Without appropriate sealing means, the use of Finwall constructed walls would not be possible to meet the design criteria for this application.

We have found that we can solve this leakage problem by judiciously spaced dam-like barriers disposed in each of the vent slots in the wall where the adjacent panel is articulated. This permits the plug to slide over the slots and in any given position a dam-like element will serve to prevent excessive leakage of the cooling air, and allowing the use of a Finwall constructed wall and its attendant cooling features.

SUMMARY OF THE INVENTION

An object of this invention is to provide improved sealing means at the interface between the side wall of a two-dimensional nozzle and an articulated paneled movable plug.

A still further object is to provide seal means for a two-dimensional nozzle for aircraft use that permits the side-wall adjacent a movable articulated paneled air cooled plug to be, for example, fabricated from segmented Finwall ® constructed walls which allows for film cooling in addition to the convection cooling inside the finwall.

Other features and advantages will be apparent from the specification and claims and from the accompanying drawings which illustrate an embodiment of the invention.

DESCRIPTION OF THE PREFERRED EMBODIMENT

Figure 1:
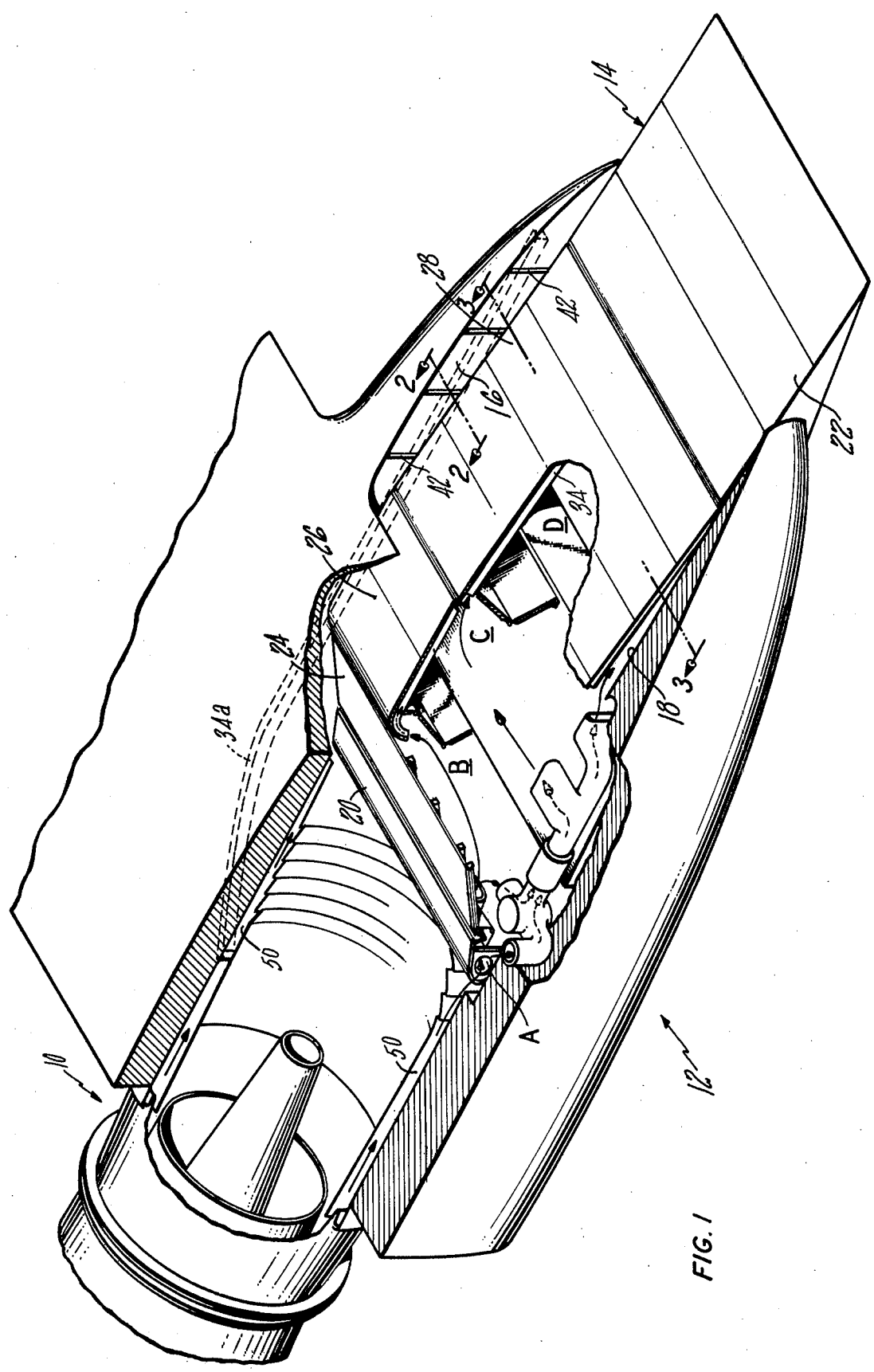
FIG. 1 is a partial view, partly in elevation and partly in section illustrating a two-dimensional nozzle attached to the exhaust pipe of a jet engine mounted in an aircraft showing the cooling compartments of the plug.

A two-dimensional nozzle with a movable plug and articulated panels is exemplified in U.S. Pat. No. 3,774,868, supra, which shows the plug in various positions to achieve improved airplane performance and maneuverability. A two-dimensional nozzle having similar capabilities is shown in FIG. 1 and shows the two dimensional nozzle generally illustrated by reference number 12 being connected to the tail pipe portion generally illustrated by reference numeral 10 of a turbofan engine (not shown). The plug or centerbody wedge generally illustrated by reference numeral 14 extends between parallel side walls 16 and 18 defining with the two-dimensional nozzle upper and lower channels for directing the engine exhaust overboard of the aircraft to achieve thrust vectoring, nozzle area control and internal nozzle expansion.

As noted from FIG. 1 the plug comprises a leading edge 20, and trailing edge 22, and adjustable panels 24, 26 and 28 mounted therebetween. As fully described in a co-pending application Ser. No. 751,428 filed by John H. Young and Gerald F. Goetz of even date, supra, the plug 14 is compartmentized into several compartments associated with each panel. Thus, each section except the trailing edge, has defined therein a separate compartment illustrated as compartments, A, B, C and D in FIG. 1.

A cooling system is incorporated to supply cooling air in each of said compartments as well as through the walls of the two-dimensional nozzle. The pressure in these compartments are regulated to be some value higher than the pressure acting externally of each of the panels. Obviously, to utilize the cooling air in its most efficient manner the flow thereof must be carefully confined and hence, leakage must be held to a minimum.

Figure 2:
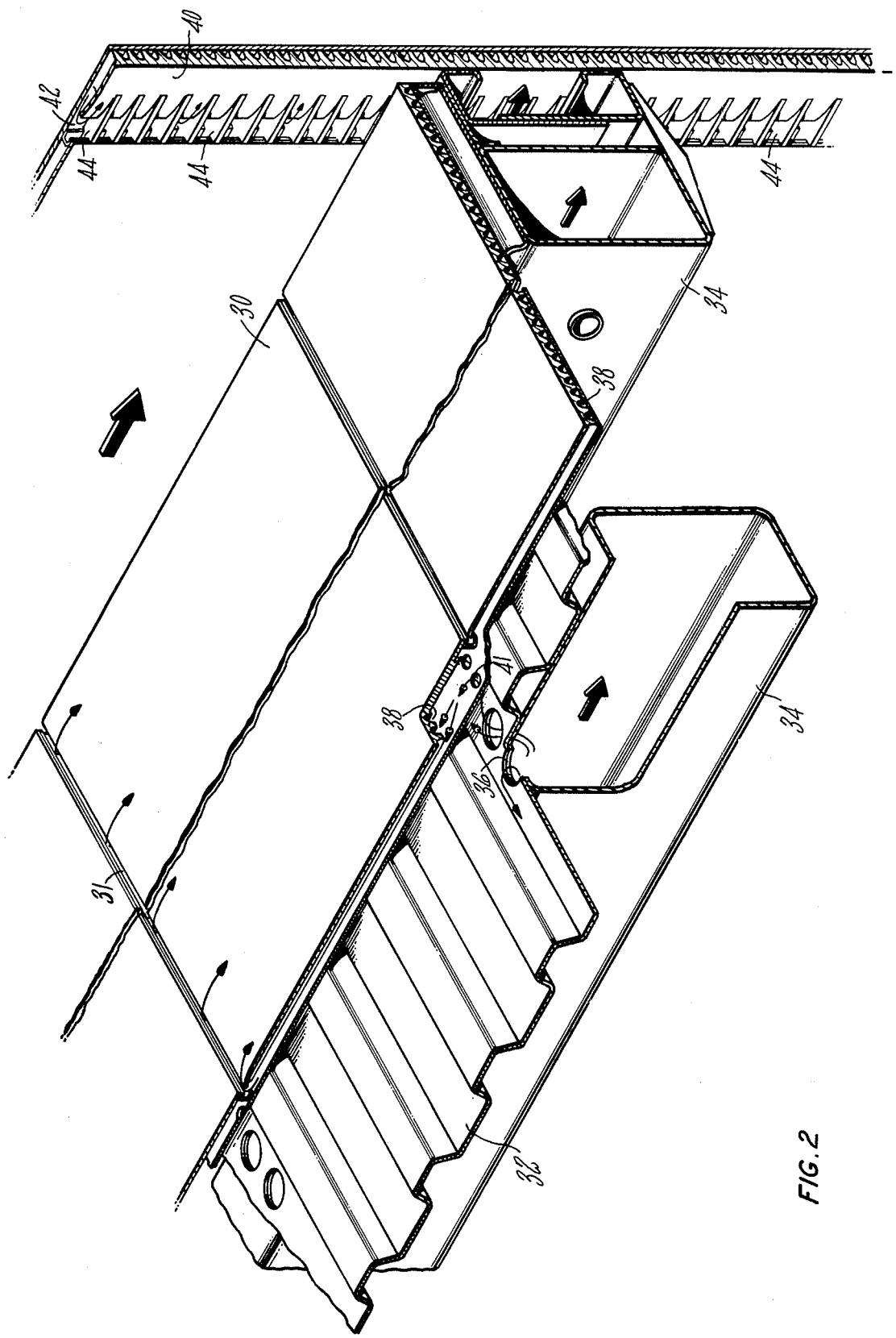
FIG. 2 is a perspective view of an enlarged section showing the details of this invention taken along the line 2—2 of FIG. 1.

As was mentioned above, it is desirous from a cooling and structural standpoint to fabricate the panels, for both the side walls of the nozzle and plug from Finwall material. For details of Finwall constructed panels reference should be made to U.S. Pat. No. 3,706,203 granted to P. Goldberg and I. Segalman and assigned to the same assignee and being incorporated herein by reference. Referring to FIG. 2 which shows a small portion of the plug and side wall of the nozzle, enlarged in size to show the details thereof, being constructed from the Finwall material 30 mounted on the corrugated support plate 32 which in turn is suitably supported to the manifold beams 34. Cool air from the upstream compartment flows through the manifold beam 34 and through suitable aperture 36 and is distributed laterally across the plug. The channels defined by corrugated member 32, in turn, feeds the open ended channels 38 with cooling air via openings 41 extending laterally across the underside of the Finwall material 30. Flow of the cooling air, as is apparent from FIG. 2, is conducted in counter flow relation with the engine exhaust flowing over the upper surface of Finwall material 30. Lateral slots 31 are formed at given distances along the axial length of the Finwall material for venting the cooling air along the outer surface of the Finwall material. This flow forms a film of cooling air along the outer surface of the Finwall material as illustrated by the arrows and eventually is conducted overboard with the exhaust gases.

It is apparent from the foregoing that the Finwall constructed panels serve to provide indirect heat exchange relation and film cooling. The side walls of the nozzles are similarly constructed and only wall 40 is shown, it being understood that all other walls may be identical thereto. As noted, the side wall panels carry slots 42 which are similar to slots 31 but however they run vertically and span the entire depth of the plug section adjacent thereto. Since the plug is movable and certain panels of the plug are movable there is a sliding relationship between panels and the adjacent side walls including the vertical slots 42. The cooling air on the underside of the panel constructed wall (i.e. in the compartment) is at a level higher than the static pressure of the exhaust gases passing on the outer surface and hence the slots exposing the chambers form a direct leakage path to exhaust, by passing its intended function.

By virtue of this invention this leakage path is eliminated while allowing the panel and plugs to perform their required functions. In accordance with this invention a plurality of dam-like wall elements 44 are judiciously spaced in the slots 42. The spacing is such that when the adjacent panel slides vertically a wall element 44 will be intermediate the compartment and the exhaust stream, hence minimizing the leakage while permitting the use of Finwall material and its intended functions. The wall elements 44 are sized such that they lie flush with the side surface of side wall 40 so as not to obstruct the movement of the plug.

Figure 3:
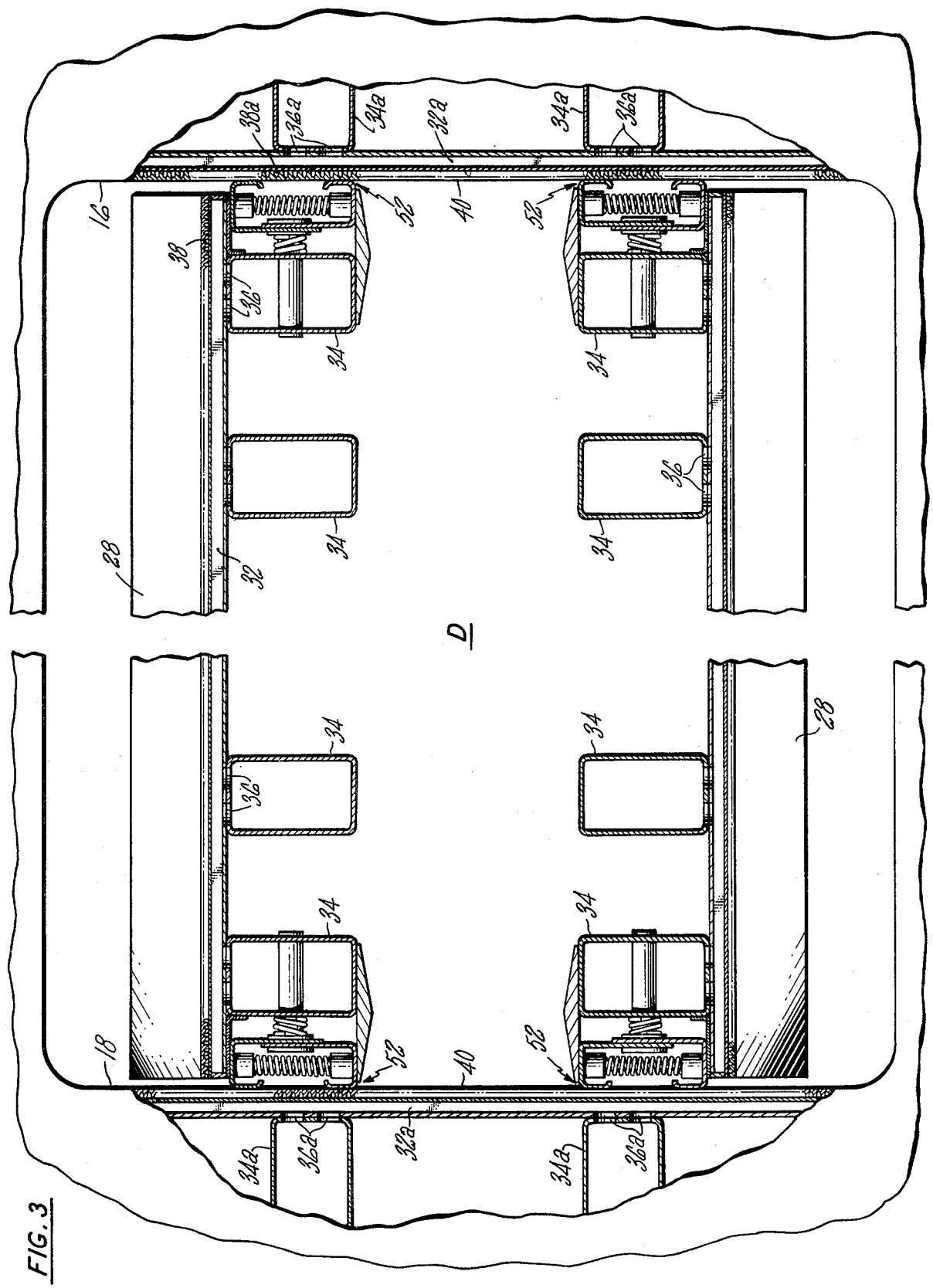
FIG. 3 is a sectional view taken along lines 3—3 of FIG. 1.

This perhaps can best be seen by referring again to FIG. 1 where it shows that the side panels 40 are fed with cooling air supplied thereto from the fan exhaust air flowing between the exhaust tail pipe and cowl defining annular passage 50. This cooling air is proportioned to feed manifolds 34a (one being shown). Like reference numerals designate similar parts and the subscript "a" indicates the side wall constructed part. The corrugated support plate 32a is supported to the manifold beams 34a which in turn supports Finwall panels 40 as clearly shown in FIG. 3. As shown in FIG. 3, the upper and lower panels 28 are movable in up and down positions as viewed from the drawing and suitable seals 52 bear against the inner surface of panel 40, so as to prevent the higher pressure cooling air in compartment D from leaking into the exhaust flowing over the exterior of panels 28.

Since the panels 40 are filmed cooled similarly to that described with respect to FIG. 2, that is cool air from manifolds 34a is directed to support members 32a via openings 36a which in turn is directed into the Finwall passages 38a via openings in the bottom plate of the Finwall panel 40. (This corresponds to the construction shown in FIG. 2 where cooling air is directed from openings 36 via the corrugated channels defined by support structure 32 via openings 41. Likewise the flow in channels 38a flows in a counterflow relation relative to the exhaust flow and discharges from the Finwall panels into the exhaust stream via slots 42. As was described above, seals 52 extend over the slots 42 which are recessed with respect thereto and hence define a leakage path for the air in compartment D to leak directly in the exhaust stream. The cross talk seal 44, as described, prevents this leakage.

We claim:

1. A two dimensional nozzle for exhausting products of combustion emanating from a gas turbine engine, a centerbody in said nozzle having side edges in sliding relation with side walls of said nozzle, cooling means for said side walls and said centerbody wherein, said cooling means for said side walls includes flat surfaced side wall panels having inner passages conducting cooling air in indirect heat exchange with said exhausting products of combustion and discharging in the exhaust gas flow path through vertical slots in said side wall panels, said slots being in communication with a cavity in said centerbody such that cooling air leaks therefrom, means to prevent said leaks including spaced dam-like elements disposed in said vertical slots such that when said side edges wipe over said spaced dam-like elements at least one of said elements extends between said cavity and the exhaust stream minimizing said leaks.

2. A two dimensional nozzle as in claim 1 wherein said dam-like elements includes a top edge lying coplanar with said flat surface of said side wall panels.

3. A two dimensional nozzle as in claim 1 wherein each said dam-like element comprises a flat plate member having side walls and a top wall, said flat plate member side walls extending between side walls of said slot and said top wall being coplanar with said flat surface of said panels and each of said flat plates being parallelly spaced relative to each other.

4. The invention as in claim 1 wherein said cooling air flowing from said slots are directed over said flat surface panels to form a film of cooling air.

* * * * *